United States Patent [19]

Simmons

[11] 3,756,163
[45] Sept. 4, 1973

[54] CONVERTIBLE VEHICLE WITH FLANGE AND RUBBER TIRED WHEELS

[75] Inventor: Jack L. Simmons, Doran, Va.

[73] Assignee: S & S Machinery Company, Inc., Richland, Va.

[22] Filed: Nov. 12, 1971

[21] Appl. No.: 198,191

[52] U.S. Cl............ 105/215 C, 105/218 A, 105/364
[51] Int. Cl...... B61d 15/00, B61f 9/00, B62d 61/12
[58] Field of Search.................... 105/215 C, 218 A, 105/364

[56] References Cited
UNITED STATES PATENTS

| | | | |
|---|---|---|---|
| 1,973,494 | 9/1934 | McCullough et al. | 105/215 C |
| 3,353,504 | 11/1967 | Kersey et al. | 105/215 C |
| 3,645,211 | 2/1972 | Gretzschel et al. | 105/215 C |
| 1,274,102 | 7/1918 | Srakula | 105/215 C |
| 2,986,102 | 5/1961 | Cox | 105/215 C |

Primary Examiner—Robert G. Sheridan
Assistant Examiner—Howard Beltran
Attorney—John W. Malley et al.

[57] ABSTRACT

A vehicle including both a flanged wheel suspension system and a rubber wheel suspension system, and including means for converting from flanged wheel operation to rubber tire operation. The means includes a support member to one end of which the rubber tire wheel is rotatably mounted while the other end is pivotally mounted to the vehicle. An arm extends generally perpendicular to the supporting member and is fixedly connected thereto adjacent the pivotal connection of said supporting member to pivot with the support member and this arm is capable of being locked in two positions by cooperating with a pin which engages the sides of the arm. In first locking position the arm engages the rubber tire with the ground while in the second locking position the rubber tire is disposed above ground level whence the vehicle rests upon flanged wheels. A spring connected between the wheel and the vehicle helps to urge the wheel upward from the ground engaging position and a handle is attached to the support member near to the rubber tire for lifting the tire from a ground engaging position.

9 Claims, 4 Drawing Figures

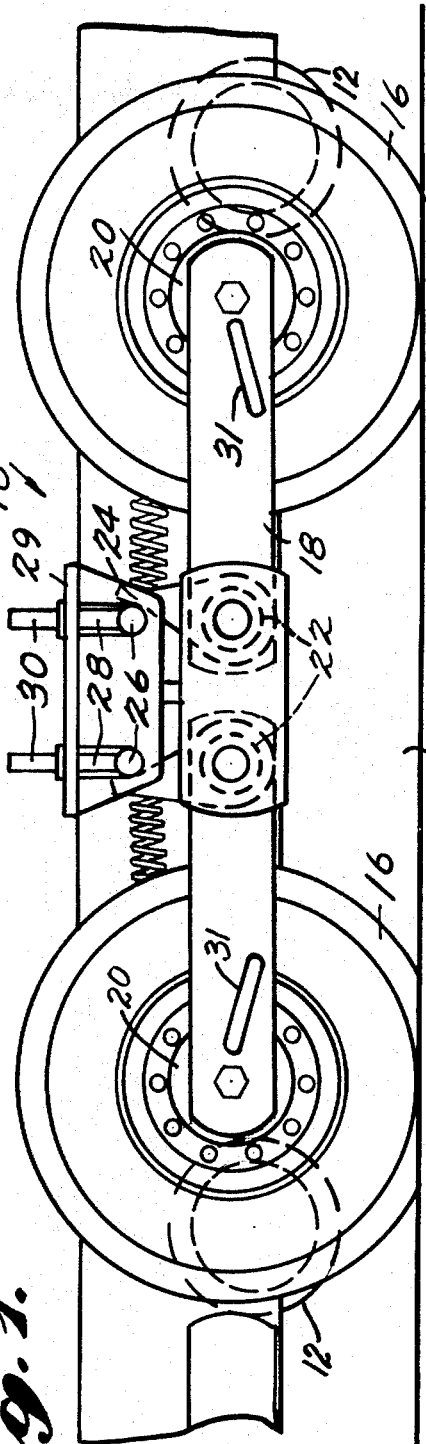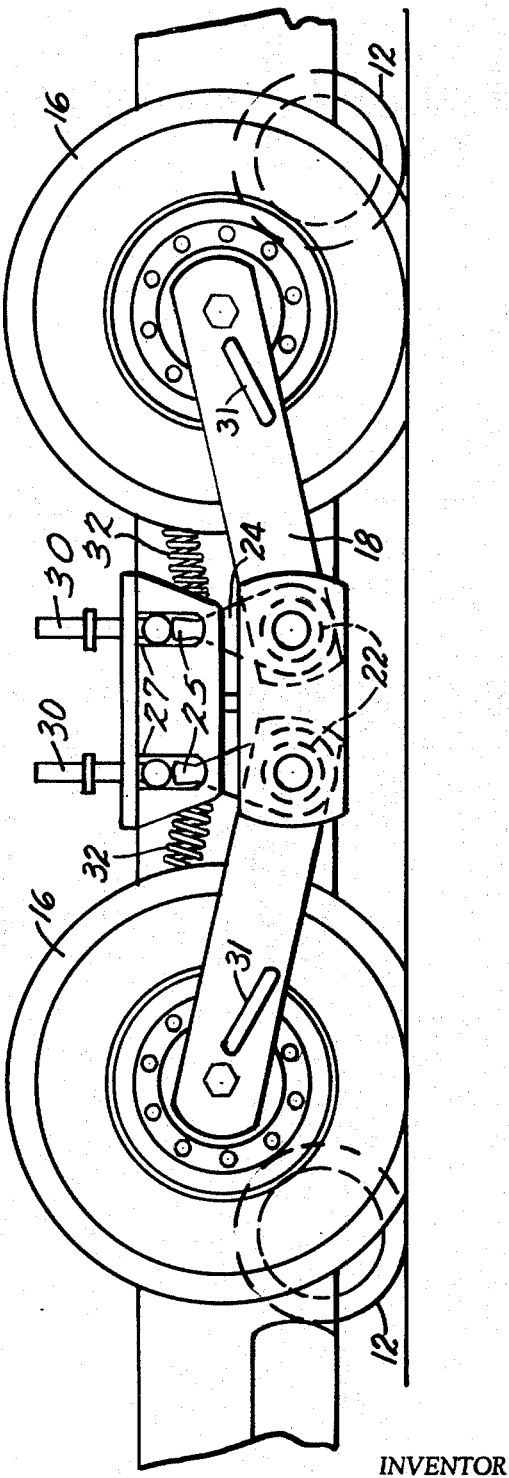
Fig. 1.
Fig. 2.
INVENTOR
JACK L. SIMMONS

PATENTED SEP 4 1973 3,756,163
SHEET 2 OF 2
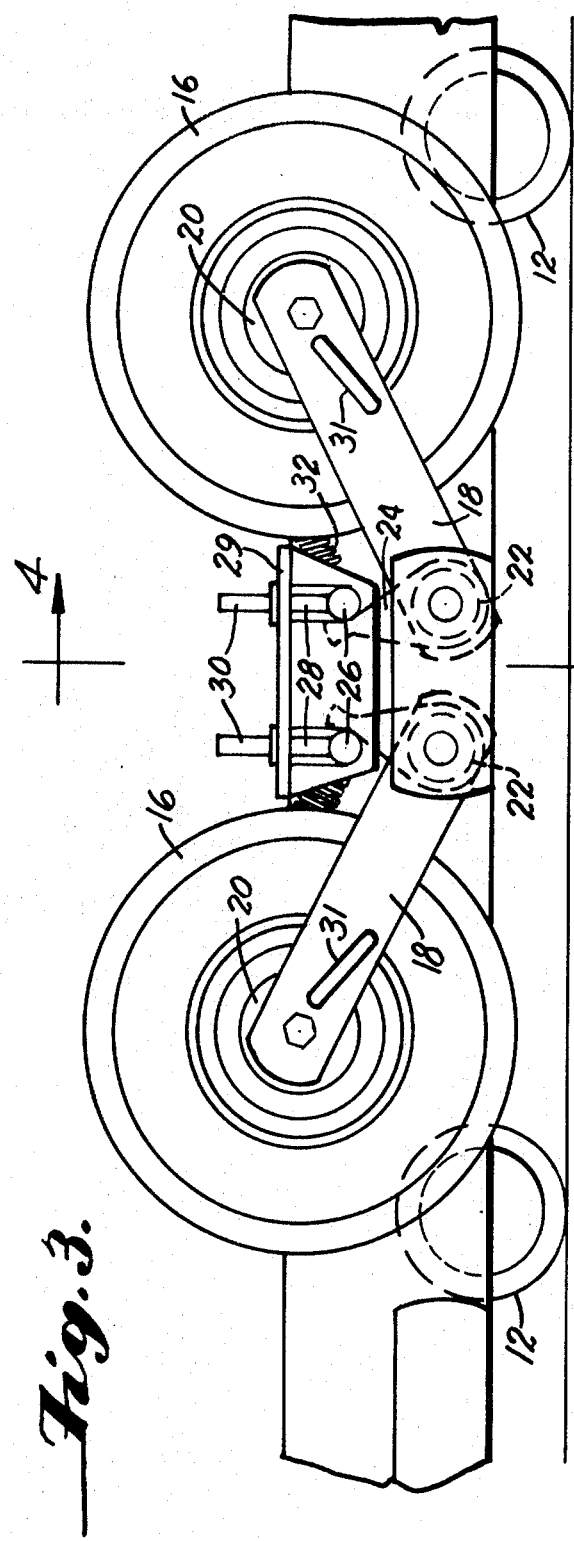
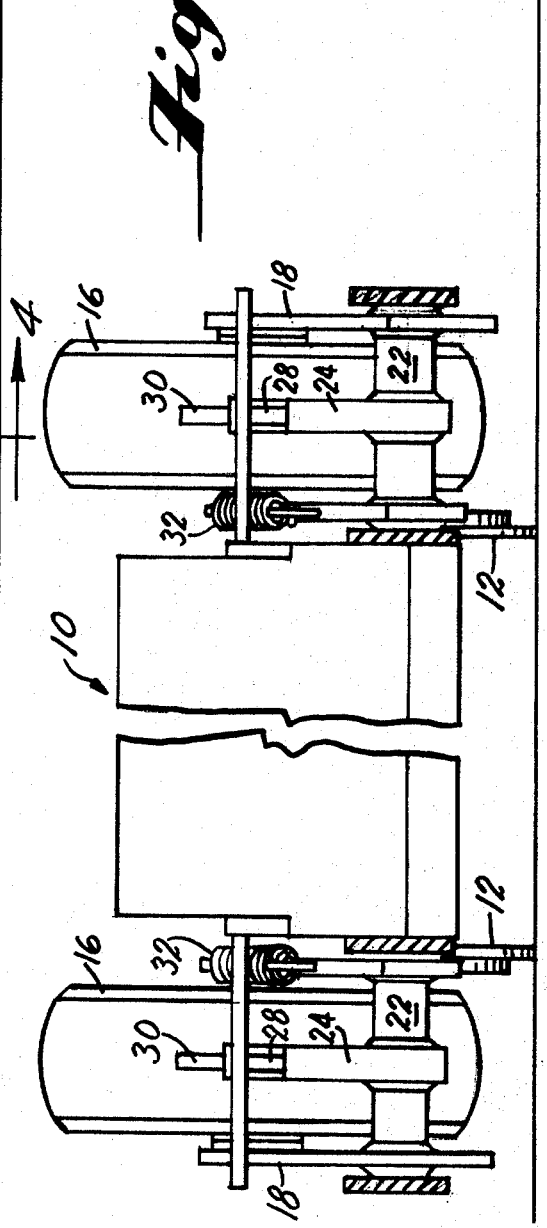
INVENTOR
JACK L. SIMMONS
BY Cushman, Darby & Cushman
ATTORNEYS

CONVERTIBLE VEHICLE WITH FLANGE AND RUBBER TIRED WHEELS

BACKGROUND OF THE INVENTION

1. Field of The Invention

This invention relates to apparatus for suspending vehicle wheels and more particularly, to apparatus whereby a vehicle wheel may be engaged with the ground in a first position but disposed above the ground in a second position. Furthermore, this invention relates to convertible vehicles such as mine cars which have both flanged and rubber tired wheels and means for converting from the flanged to the rubber tire wheel mode of operation.

2. Description of the Prior Art

It is often desirable to provide in a single vehicle the capacity for traveling upon rails as well as upon a smooth roadway surface. For example, such a capacity may be desirable in a rail-highway car. Such a capability is also desirable in mine cars because generally coal mines are equipped with a railway from several hundred feet outside the mine entrance to within approximately 500 feet of the area where the coal is being mined. Thus, it is desirable that the mine car operate on the rails with the rubber tires in a non-engaging position until the car reaches the end of the track at which time the rubber tires are placed into an engaging position and the vehicle continues to travel to the coal mining area. The prior art has provided intricate schemes for engaging the rubber tires of a mine car with the ground. For example, in the U.S. Pat. to Kersey et al., No. 3,353,504, a mine car is provided with flanged wheel support and rubber tires are additionally provided on either side thereof which are raised or lowered with respect to the flanged wheels by means of a plate to which the rubber wheels are attached and which is, in turn, activated by a hydraulic cylinder. It would be desirable to replace the relatively complex activating mechanism of Kersey et al with a simple mechanical device. However, although the prior art is rich in devices for raising and lowering wheels into engagement with a roadway or rails, these devices specifically require additional tools such as for example the rail conversion mechanism in the patent to Cox, U.S. Pat. No. 2,986,102 issued May 30, 1961 or they require a fairly complex mechanical linkage system such as shown, for example, in the patent to Srakula, U.S. Pat. No. 1,274,102 issued July 30, 1918.

SUMMARY OF THE INVENTION

It is the object of the applicant's invention to provide a very simple and therefore reliable and maintainance-free apparatus for converting a vehicle from flanged wheel to rubber tire suspension. The applicant achieves this result by reducing the number of moving parts in his suspension apparatus to a bare minimum. Thus, in the applicant's invention, each rubber tire is rotatably mounted on one end of a support member, while the other end of the support member is pivotally mounted to the vehicle. An arm which extends generally perpendicular to the support member and which is integral therewith, or fixedly attached thereto, is also pivotally mounted about the same pivot point as the support member. Both sides of this arm can alternately engage with a vertically movable pin such that the arm and therefore the support member and attached wheel may be locked into a first position in which the wheel engages the ground and a second position in which the wheel is removed from engagement with the ground. In addition, a spring is attached between the wheel and the vehicle in such a manner as to urge the wheel towards the vehicle when the wheel is being removed from its ground engaging to its disengaged position. Similarly, a handle is disposed adjacent to the wheel on the support member which allows an operator to apply an appropriate torque, which, in conjunction with the spring, removes the wheel from an engaged to a disengaged position. Naturally, a plurality of wheels mounted as above are disposed about the convertible vehicle so as to support the vehicle which is running upon a smooth roadway.

BRIEF DESCRIPTION OF THE DRAWINGS

A detailed description of the preferred embodiment will now be undertaken with regard to the drawings in which:

FIG. 1 is a side view of a portion of a convertible vehicle showing the rubber wheels in a ground engaging position;

FIG. 2 is a side view of a convertible vehicle showing rubber wheels in an intermediate position;

FIG. 3 is a side view of a portion of a convertible vehicle showing the rubber wheels locked into a disengaged position with respect to the ground, and FIG. 4 is a cross sectional view of the mine car along the line 4—4 shown in FIG. 3.

DETAILED DESCRIPTION OF THE PREFERRED EMBODIMENT

Referring to FIG. 1 reference numeral 10 refers to a mine car. The mine car 10 is supported by flanged wheels 12 to roll upon a standard rail system 14. In addition, mine car 10 is also supported in FIG. 1 by pneumatic rubber tired wheels 16 which are attached to the mine car by means of the applicant's improved suspension.

Since each of the wheels 16 is supported by an identical system, reference need only be made to the system for supporting one of the wheels. Thus, the right wheel 16 shown in FIG. 1 is rotatably mounted to one end of support arm 18 by well-known axle means 20. The other end of support arm 18 is fixedly connected to a tube 22 as by welding. Tube 22 is, in turn, pivotally mounted to the frame of mine car 10 so that support arm 18 may be pivoted with respect to mine car 10. An arm 24 is also fixedly connected to tube 22 as by welding in such a manner as to turn with support arm 18. Arm 24 is attached at such an angle to support 18 and has such a configuration that when arm 24 is disposed as is shown in FIG. 1, arm 18 assumes a position generally parallel to the ground level. But when arm 24 disposed as is shown in FIG. 3 arm 18 makes an acute positive angle with the ground. Arm 24 cooperates with the stop member 26 of locking pin 28 in order to lock support arm 18 and therefore wheel 16 into either of the positions shown in FIGS. 1 and 3.

When it is desired to remove wheel 16 from the position shown in FIG. 1 to the position shown in FIG. 3, locking pin 28 is gripped about handle portion 30 by an operator and lifted to the position shown in FIG. 2 at which point the stop member 26 is disposed above tip 25 of arm 24. The stop member 26 being guided in guide 27 and the shaft of pin 28 being guided by an aperture in plate 29, pin 28 is constrained to move vertically. When the pin 28 is disposed at its upmost position as shown in FIG. 2 in which stop member 26 clears tip 25 of arm 24, the operator also grasps handle 31 which is fixedly connected to arm 18 adjacent to wheel 16 to urge the wheel upwards to the position shown in FIG. 3. The operator is aided in this effort by means of spring 32, a 2 inch diameter coil spring which is under tension in the position shown in FIGS. 1 and 2. Once the wheel has been raised to the position shown in FIG. 3, the locking pin may be moved in a downwardly direction until it assumes the position shown in FIG. 3 at which time wheel 16 is locked in an upward position and mine car 10 is supported fully by flanged wheels 12. The above description covers only one side of mine car 10, but, obviously, both flanged wheels 12 and rubber wheels 16 are provided on either side of mine car 10 as is shown in FIG. 4 to fully support this vehicle either on a rail system or on a smooth roadway.

While the above description fully covers the preferred embodiment, it is noted that many modifications may be possible within the scope of the invention.

What is claimed is:

1. Apparatus for suspending a vehicle wheel at plural positions comprising a support member pivotally connected at a first end to said vehicle and including mounting means disposed adjacent said second end for rotatably mounting said wheel, an arm extending at an angle to the longitudinal axis of said member, said arm being fixedly attached to said first end of said member adjacent the pivot axis of said support member so as to pivot with said support member, and a means for locking said arm in either a first position in which said wheel engages the ground or a second position in which said wheel does not contact the ground.

2. The apparatus of claim 1 further including spring means connected between said support member and said vehicle for urging said wheel away from the ground when said arm is in its second position.

3. The apparatus of claim 1 further including a handle attached to said support member near said mounting means for helping to raise said wheel.

4. A vehicle which is capable of running on rails or a smooth roadway comprising a plurality of flanged wheels rotatably mounted to said vehicle and so disposed about said vehicle for running upon rails, a plurality of wheels which are adapted to support said vehicle for running upon said smooth roadway when placed into engagement therewith and means for moving said roadway wheels to and from positions of engagement with said roadway, said moving means including for each wheel a support member pivotally connected at a first end to said vehicle and including mounting means disposed adjacent said second end for rotatably mounting said wheel, an arm extending at an angle to the longitudinal axis of said member, said arm being fixedly attached to said first end of said member adjacent the pivot axis of said support member so as to pivot with said support member, and a means for locking said arm in either a first position in which said wheel engages the ground or a second position in which said wheel does not contact the ground.

5. The apparatus of claim 4 further including spring means connected between said support member and said vehicle for urging said wheel away from the ground when said arm is in its second position.

6. The apparatus of claim 4 further including a handle attached to said support member near said mounting means for helping to raise said wheel.

7. In a vehicle of the type having a frame and a set of wheels mounted so as to be adjustable between an upper non-operating position and a lower operating position with respect to the frame, the improved mounting for a wheel comprising: a support arm having a first end pivotally connected to the frame for swinging movement between upper and lower positions in a vertical plane about a horizontal axis, said support arm carrying at least one of said wheels at a location outwardly of said axis, another arm extending at an angle to the longitudinal axis of said support arm, adjacent the pivot axis of said support arm, said other arm having an outer end and having an inner end fixed to said support arm at the location of said axis so that upon swinging movement of said support arm said other arm also swings about said axis; and locking means carried by said vehicle frame for engaging the outer end portion of said other arm to lock said arm in either the upper or lower position of said support arm.

8. Apparatus as in claim 7 wherein said support arm extends generally longitudinally of said vehicle and said other arm extends generally upwardly and wherein said locking means includes a locking element which is engageable with opposite surfaces of the outer end portion of said other arm in said upper and lower positions.

9. Apparatus as in claim 8 wherein said locking element is mounted for generally vertical movement relative to said vehicle frame so as to be movable out of the path of said other arm during swinging movement thereof and movable into said path in either said upper or lower positions of said arms.

* * * * *